United States Patent Office 3,630,994
Patented Dec. 28, 1971

3,630,994
POLYIMIDES PREPARED FROM SUBSTITUTED QUINOXALINES
Billy M. Culbertson, Burnsville, Minn., assignor to Ashland Oil & Refining Company, Ashland, Ky.
No Drawing. Application May 27, 1969, Ser. No. 828,356, which is a division of application Ser. No. 539,641, Apr. 4, 1966. Divided and this application Dec. 29, 1969, Ser. No. 1,937
Int. Cl. C08g 20/32
U.S. Cl. 260—47 CP                10 Claims

ABSTRACT OF THE DISCLOSURE

Quinoxalines represented by the general formula

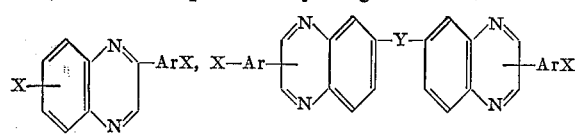

and

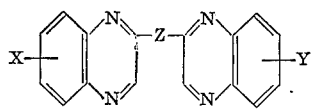

wherein X is nitro or amino, Ar is divalent aromatic hydrocarbon radical, Y is a covalent bond or a divalent linking radical and Z is a divalent radical containing one or two benzene rings. The compositions are useful in the formation of fiber and film forming polyimides and polyamides and in the formation of molding resins.

CROSS-REFERENCE TO RELATED APPLICATIONS

This application is a division of application Ser. No. 828,356 filed May 27, 1969, which in turn is a division of application Ser. No. 539,641 filed Apr. 4, 1966.

The present invention relates to novel polyfunctional substituted quinoxalines, to methods for their preparation, and to polymers derived from the polyfunctional substituted quinoxalines.

The novel substituted quinoxalines have the general formulas (I) 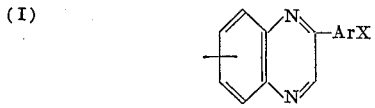

(II) 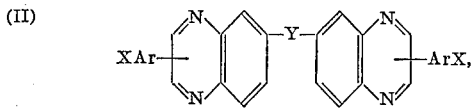

or (III) 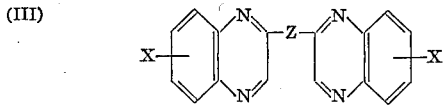

wherein X is a nitro or an amino group, Ar is a divalent aromatic hydrocarbon radical, and preferably a benzene radical, Y is a bond, oxygen, sulfur, sulfonyl, lower alkylene, or any other divalent radical capable of linking two quinoxaline groups through the benzene ring, and Z is a divalent aromatic radical containing one or two benzene rings.

The novel dinitro and diamine substituted quinoxalines, bisquinoxalines, and bisquinoxalinyl compounds of the present invention are prepared by refluxing aqueous solutions of nitro-substituted aryl glyoxal hydrates with nitro-substituted phenylene-o-diamine or bisphenylene-o-di-amine hydrochlorides. The amino derivatives are prepared from the corresponding nitro derivatives by hydrogenation using any of the various hydrogenation catalysts, e.g. Raney nickel, and procedures heretofore developed for hydrogenating nitro groups to amino groups. Other suitable methods for hydrogenating the dinitroquinoxalines include the use of platinum on carbon, the reduction with stannous chloride and HCl or iron with HCl or hydrazine with Raney nickel. The process for the preparation of the quinoxalines, bisquinoxalines, bisquinoxalinyl compounds is further illustrated by the following chemical equations employing nitrophenyl glyoxals and phenylene diglyoxals:

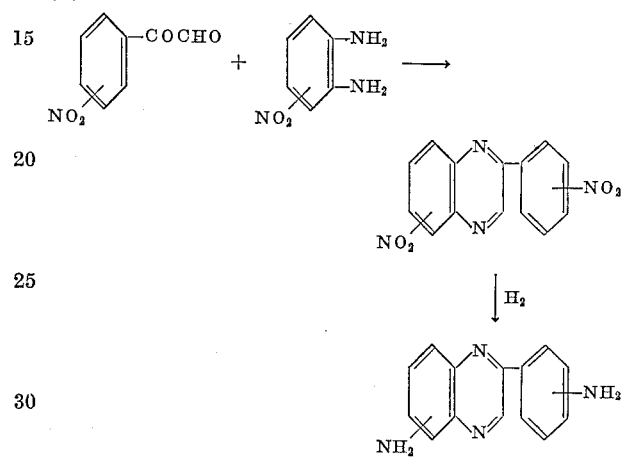

wherein Y has the above-indicated meanings. In the alternative, the quinoxalines can also be prepared from unsubstituted glyoxals and ortho-diamines and the resulting quinoxalines can the be nitrated to result in the nitrated quinoxalines.

The novel quinoxalines of the present invention find utility as monomers in the formation of polyamide resins when condensed with dicarboxylic acids and in the formation of polyimides when condensed with tetracarboxylic acids or anhydrides. Because of their cyclic structure, the diamines of the present invention are of particular utility in the formation of polyimides having outstanding high temperature properties by condensation with aromatic tetracarboxylic acids or anhydrides.

The glyoxals employed in the formation of the subsituted quinoxalines are obtained by the oxidation of acetophenone, nitroacetophenone, 4,4'-diacetyl-diphenyl, methyl α-naphthyl ketone, methyl β-naphthyl ketone, methyl α-nitronaphthyl ketone, methyl β-nitronaphthyl ketone, acetyldiphenyl, 4'-nitro-4-acetyl-diphenyl, and dimethylnaphthylene diketone with an oxidizing agent such as selenium dioxide (Riley reaction). The stable hydrate, $ArC(OH)_2CHO$, is formed when the glyoxal is dissolved in water. Suitable aromatic di- and tetraamines include nitro-o-phenylene diamine, 3,3'-diaminobenzidine, 3,3',4-4'-tetraaminobiphenyl ether, 2,2',3,3'-tetraaminobiphenyl ether, 3,3',4,4'-tetraaminobiphenyl ether, 2,2',3,3'-tetraaminobiphenyl ether, 3,3',4,4'-tetraaminobenzophenone, 2,2-bis(2,3-diaminophenyl)propane, 1,1-bis(2,3-diaminophenyl)ethane, bis(3,4-diaminophenyl)sulfone, 2,2-bis-(3,4 - diaminophenyl)propane, bis(2,3 - diaminophenyl) methane, bis(3,4 - diaminophenyl)methane, bis(3,4 - diaminophenyl)sulfide, and 2,2',3,3' - tetraaminobiphenyl. Suitable diglyoxals employed in reaction (C) include m-phenylene diglyoxal, p-phenylene diglyoxal, 4,4'-biphenylene diglyoxal, 3,3'-biphenylene diglyoxal, 4,4'-biphenylene ether diglyoxal, and 4,4'-bisphenylene methane diglyoxal.

The polyamides of the present invention are preferably obtained by condensing the quinoxaline diamines with dicarboxylic acid anhydrides or dicarboxylic acid dihalides. Anhydrides and dihalides of the following acids can be employed: glutaric, succinic, adipic, pimelic, sebacic, terephthalic, and similar acids which have heretofore been employed in the formation of polyamides. The polyamide is obtained by admixing substantially equivalent concentrations of both the diamine and the dicarboxylic compound in the presence or absence of a solvent and heating the resulting mixture, if necessary, to result in the formation of the polyamide. Use of the acid dihalides and particularly the acid dichloride does not require heating to result in the formation of the polyamide and both films and fibers can be obtained by interface polymerization employing each component of the polyamide in solution in separate immiscible solvents. The specific procedures for the preparation of polyamides are well-known in the literature and since such procedures are applicable to the quinoxaline diamines of the present invention, further description of such methods is not deemed necessary.

In view of the cyclic nature of the quinoxaline diamines, they are of particular value in the preparation of polyimides having superior high temperature properties. In the formation of polyimides, the quinoxaline diamine is reacted with a tetracarboxylic dianhydride, to form in the first step a polyamide-acid which can, however, contain some polyimide units. The polyamide is then preferably formed into the desired structure, e.g. a film or fiber, and thereafter further reacted to convert the amide-acid groups to imide groups. It is generally preferred, although not essential, to shape the polymeric product before complete conversion to the polyimide structure since the polyamide-acid has superior fabricating properties as compared to the polyimide. In coating applications it is similarly preferred to employ the polyamide-acid form of the polymer rather than the polyimide form because of the greater solubility of the polyamide-acid.

The polymerization of the dianhydride with the diamine to the polyamide-acid is generally carried out by admixing the components in the presence of a diluent which is at least a solvent for one of the components and preferably a solvent for both components under preferably anhydrous conditions, at temperatures below about 150° C. and preferably at temperatures below 100° C. More than one diamine and more than one dianhydride can be employed. Additionally, it is possible to employ in combination with the heterocyclic diamines of the present invention such diamines as have been previously employed in the formation of polyimides.

The ratio in which the dianhydride and the diamine are employed has a significant effect on the molecular weight of the resulting polyamide-acid and should, therefore, be closely controlled. In general, the highest molecular weights are obtained when substantially stoichiometric quantities of the diamine and dianhydride are employed and such is preferred. Furthermore, if non-stoichiometric ratios are employed, it is preferred to employ an excess of the diamine since an excess of the dianhydride tends to degrade the polymer. The extent of the excess of the diamine, therefore, provides a means of controlling the molecular weight of the resulting polyamide-acid.

Although for many applications, particularly the formation of solid shapes such as films, fibers, and molded articles, high molecular weight polyamide-acids result in polyimides of superior properties, other applications do not require a high molecular weight polyamide-acid to obtain the desired polyimide properties. Thus compositions in which less than substantially 100% of the amine groups have reacted with the acid anhydride groups are useful. It is only necessary that the resulting polyamide-acid have sufficient polyamide-acid linkages to be useful in the intended application. In coating applications, for example, it may be preferable to employ polyamide-acids which are not polymerized to the highest possible molecular weight in order to avoid unsuitable viscosities in the coating compositions at the desired concentrations of the resin vehicle. It should be recognized that further increases in molecular weight result during the conversion of the amide-acid groups to the imide groups. In general, the average molecular weight of the polyamide-acid formed should be such that the polymer has an inherent viscosity of at least 0.1 and preferably of greater than 0.3 wherein the inherent viscosity is determined employing a 0.5 weight percent polymer solution in a suitable solvent at 25° C.

The diluents which are employed in the formation of the polyamide-acid, as well as in the formation of the above-described polyamides, are liquids which do not substantially react with the functional groups of the reactants and which are capable of dissolving at least one of the reactants and preferably both of the reactants. Solvents capable of dissolving both reactants are normally also solvents for the polymer formed. The preferred method of polymerizing the novel polyimides of the present invention is therefore a solution polymerization. In general, inert polar organic solvents which exhibit a high dipole moment are useful. The normally liquid organic solvents of the N,N-dialkylcarboxylamide class are, therefore, useful as solvents in the process of this invention. The preferred solvents are the lower molecular weight members of this class wherein the acids have from 1 to 3 carbon atoms, particularly N,N-dimethylformamide and N,N-dimethylacetamide. These solvents are preferred because of their ready availability, excellent solvent power for both reactants and resulting polymer, and ready evaporation, displacement, or diffusion. Other typical compounds of this class of solvents include N,N-diethylformamide, N,N-diethylacetamide, N,N-dimethylmethoxyacetamide, and N-methylcaprolactam. Other suitable organic polar solvents include tetramethylurea, dimethyl sulfoxide, N-methyl-2-pyrrolidone, pyridine, dimethylsulfone, hexamethyl phosphoramide, tetramethylene sulfone, butyrolactone, and mixtures of the solvents enumerated hereinabove. These solvents can furthermore be employed in combination with other diluents such as benzene, benzonitrile, dioxane, furane, xylene, and toluene, which are not satisfactory solvents for the reagents and polymer by themselves.

The quantity of diluent employed in the polymerization can be varied widely but should be sufficient to prevent excessive viscosities in the resulting reaction product which would interfere in the temperature control of the reaction mixture and in the further handling of the polyamide-acid. Optimum quantities of solvent will depend on the intended utility of the polymer. For forming the polyamide-acid into shaped articles, concentrations as high as 40% of the polymer in 60% of solvent are suitable. In coating applications, on the other hand, lower polymer concentrations requiring larger quantities of diluent may be preferred. In general, diluents are employed such that the resulting polymer solution has a solids content of 0.5 to 50% by weight of the composition.

Anhydrous conditions are desirable since moisture affects the balance of the reactive anhydride to the amine groups in hydrolizing anhydride groups to unreactive acid groups. For the same reasons, it is preferred to employ the reagents in the purest form possible.

Although polymerization temperatures as high as 150° C. can be employed, it is generally preferred to employ temperatures below 100° C. and particularly temperatures in the range of −20° C. to 50° C. The formation of the polyamide-acid occurs rapidly at all temperatures, although higher molecular weights are generally obtained at lower temperatures. Increasingly higher reaction temperatures, particularly above 50° C. to 60° C., will result in increasingly higher ratios of imide to amide-acid groups in the resulting polymeric material and hence temperature is employed to produce the desired ratio of these groups in the resulting polymeric product.

Neither reaction time nor pressure is a significant variable in the polymerization since the rate of polymerization is extremely rapid and since none of the components requires pressurization, although such is, of course, not excluded from the scope of the process described. In conducting the polymerization, it is generally preferred to add the dianhydride slowly to a solution of the amine. Upon complete addition of the anhydride, the polymerization is usually continued until no further reaction takes place as measured by heat release of the exothermic reaction. In order to maintain the desired reaction temperature, cooling means are preferably employed. The polyamide-acid, as indicated above, is preferably obtained in the form of a solution. The polymer is readily isolated by precipitation and filtration employing a miscible nonsolvent.

The conversion of the polyamide-acid to the polyimide can be accomplished by various means of which heating the polyamide-acid is preferred. Generally, temperatures in the range of 150° C. to 450° C. are employed, although polyimide formation using longer exposures at lower temperatures and shorter exposures at higher temperatures is possible. Conversion to the polyimide can also be accomplished by use of dehydrating agents, particularly monocarboxylic acid anhydrides such as benzoic acid anhydride, acetic acid anhydride, or combinations of such anhydrides with tertiary amines.

The dianhydrides which are employed in the formation of the novel polyimides of the present invention are those which have heretofore been employed in the formation of polyimides, and have the general formula

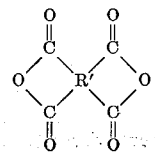

wherein R′ represents a tetravalent radical and preferably a tetravalent radical containing at least one ring of six carbon atoms, said ring being characterized by benzenoid unsaturation, the four carbonyl groups being attached directly to separate aromatic carbon atoms of the R′ radical and each pair of carbonyl groups being attached to adjacent carbon atoms in the R′ radical. Suitable dianhydrides include the following:

3,3′,4,4′-benzophenone tetracarboxylic dianhydride;
pyromellitic dianhydride;
2,3,6,7-naphthalene tetracarboxylic dianhydride;
3,3′,4,4′-diphenyl tetracarboxylic dianhydride;
1,2,5,6-naphthalene tetracarboxylic dianhydride;
2,2′,3,3′-diphenyl tetracarboxylic dianhydride;
2,2-bis(3,4-dicarboxyphenyl)propane dianhydride;
bis(3,4-dicarboxyphenyl)sulfone dianhydride;
3,4,9,10-perylene tetracarboxylic dianhydride;
bis(3,4-dicarboxyphenyl)ether dianhydride;
naphthalene-1,2,4,5-tetracarboxylic dianhydride;
naphthalene-1,4,5,8-tetracarboxylic dianhydride;
2,6-dichloronaphthalene-1,4,5,8-tetracarboxylic dianhydride;
2,7-dichloronaphthalene-1,4,5,8-tetracarboxylic dianhydride;
2,3,6,7-tetrachloronaphthalene-1,4,5,8-tetracarboxylic dianhydride;
phenanthrene-1,8,9,10-tetracarboxylic dianhydride;
2,2-bis(2,3-dicarboxyphenyl)propane dianhydride;
1,1-bis(2,3-dicarboxyphenyl)ethane dianhydride;
1,1-bis(3,4-dicarboxyphenyl)ethane dianhydride;
bis(2,3-dicarboxyphenyl)methane dianhydride;
bis(3,4-dicarboxyphenyl)methane dianhydride;
bis(3,4-dicarboxyphenyl)sulfide dianhydride; and
benzene-1,2,3,4-tetracarboxylic dianhydride.

The novel quinoxaline diamines employed in the formation of polyamides and polyimides include:

2-(p-aminophenyl)-6-aminoquinoxaline;
2-(p-aminophenyl)-7-aminoquinoxaline;
2-(m-aminophenyl)-6-aminoquinoxaline;
2-(m-aminophenyl)-7-aminoquinoxaline;
2-(6-aminonaphthyl)-6-aminoquinoxaline;
2,2′-di(p-aminophenyl)-6,6′-diquinoxaline;
2,2′-di(m-aminophenyl)-6,6′-diquinoxaline;
2,2′-di(p-aminophenyl)-6,6′-diquinoxalinyl methane;
2,2′-di(p-aminophenyl)-6,6′-diquinoxalinyl ether;
2,2′-di(p-aminophenyl)-6,6′-diquinoxalinyl sulfide;
2,2′-di(p-aminophenyl)-6,6′-diquinoxalinyl sulfone;
2,2′-di(p-aminophenyl)-6,6′-diquinoxalinyl propane;
2,2′-di(m-aminophenyl)-6,6′-diquinoxalinyl ether;
2,2′-m-phenylene bis(6-aminoquinoxaline);
2,2′-p-phenylene bis(6-aminoquinoxaline);
2,2′-p-phenylene bis(7-aminoquinoxaline);

and mixtures of such diamines.

The preparation of the novel substituted quinoxalines and the polymerization thereof is further illustrated in the following examples.

EXAMPLE 1

A deoxygenated aqueous solution consisting of 300 parts of water and 19.7 parts of p-nitrophenyl glyoxal hydrate is added with stirring to a deoxygenated aqueous solution consisting of 300 parts of water, 15 parts of concentrated hydrochloric acid, and 15.3 parts of p-nitro-o-phenylene diamine and the resultant solution is refluxed for 3 hours. After cooling, the yellow-tan precipitate is collected by suction filtration, washed on the glass filter several times with water and dried in vacuo (5 mm. Hg) for 4 hours at 80° C. to afford 29.1 parts (theory, 29.6 parts) of a yellow-tan colored solid (A) with a melting point range of 210° (starts to soften) to 254° C. Recrystallization of the material from 1800 parts of tetrahydrofuran affords 15 parts of pale yellow crystals (B), M.P. 288° C. to 289° C. Evaporation of the tetrahydrofuran filtrate in vacuo affords 14 parts of pale yellow solid material (C), M.P. 234° C. to 245° C. An attempt to recrystallize (C) from 400 parts of benzene affords 7 parts of benzene-insoluble material (D), M.P. 256° C. to 278° C. Upon cooling, 3 parts of yellow crystalline material (E) is precipitated from the benzene solution, M.P. 270° C. to 281° C. Evaporation of the benzene solution to ca. 200 ml. affords 3 parts of a second crop of yellow-brown crystalline material (F), M.P. 216° C. to 220° C. Recrystallization of compound (B) from tetrahydrofuran affords yellow needles of 2-(p-nitrophenyl)-6-nitroquinoxaline, M.P. (corrected) 286.5° C. to 287.5° C., $\lambda_{max}$ 275 m$\mu$ (dioxane) and infrared absorption bands (Nujol mull) attributable to quinoxaline, nitro, and aromatic residues. Elemental analysis also supports the structure of the quinoxaline.

Calculated for $C_{14}H_8N_4O_4$(B) (percent): C, 56.75; H, 2.70; N, 18.91. Found (percent): C, 56.69; H, 2.70; N, 18.75.

Recrystallization of compound F (2-[p-nitrophenyl]-7-nitroquinoxaline) from benzene affords golden-brown plates, M.P. 216° C. to 218° C., $\lambda_{max}$ 282 m$\mu$ (dioxane), infrared absorption bands (Nujol mull) indicative of quinoxaline, nitro, and aromatic residues analogous to (B) and suitable for elemental analysis.

Calculated for $C_{14}H_8N_4O_4$ (percent): C, 56.75; H, 2.70; N, 18.91. Found (percent): C, 56.59; H, 2.75; N, 18.95.

EXAMPLE 2

Using the preparative techniques of Example 1, 18.0 parts of m-nitrophenyl glyoxal is reacted with 15.3 parts of p-nitro-o-phenylene diamine to obtain 23 parts of crude 2-(m-nitrophenyl)-6-nitroquinoxaline (A), M.P. 182° C. to 195° C. Several recrystallizations of (A) from benzene afford yellow needles of (A) (M.P. 202° C. to 203° C., $\lambda_{max}$ 265 m$\mu$ and 324 m$\mu$ and infrared absorption bands indicative of quinoxaline, nitro, and aromatic residues) suitable for elemental analysis.

Calculated for $C_{14}H_8N_4O_4$ (percent): C, 56.75; H, 2.72; N, 18.91. Found (percent): C, 56.53; H, 2.80; N, 18.57.

EXAMPLE 3

Using the preparative techniques of Example 1, 3.94 parts of 3,3'-diaminobenzidine tetrahydrochloride dihydrate is reacted with 3.94 parts of p-nitrophenyl glyoxalyl monohydrate in 200 parts of deoxygenated aqueous solution to afford a reddish-brown precipitate. The precipitate is washed with hot water, 95% ethanol and dried in vacuo (0.5 mm. Hg) at 100° C. to afford 4.6 parts (theory, 4.9 parts) of a dark brown solid, M.P. 325° C. to 335° C. The infrared spectrum, ultraviolet spectrum, and elemental analysis are consistent with the the structure of 2,2'-di(p-nitrophenyl)-6,6'-diquinoxaline.

EXAMPLE 4

Using the procedure of Example 1, 4.2 parts of 3,3', 4,4'-tetraaminobiphenyl ether tetrahydrochloride is reacted with 4.0 parts of p-nitrophenyl glyoxyl monohydrate in 200 parts of deoxygenated aqueous solution to afford a precipitate. On isolation, solution and reprecipitation of the reaction product, 2,2'-di(p-nitrophenyl-6,6'-diquinoxalinyl ether, is obtained.

EXAMPLE 5

The compound 2-(m-nitrophenyl)-6-nitroquinoxaline, 3 parts, is dissolved in 100 parts of a 3:1 ethanol-benzene solution. After addition of 0.5 part of Raney nickel catalyst, 15 parts of hydrazine hydrate solution (85%) is added to the system slowly, with stirring. At the end of the hydrazine addition, the solution is refluxed for an additional hour. The hot solution is treated with decolorizing charcoal (Norit-A), filtered and poured over ice to obtain brown needles of 2-(m-aminophenyl)-6-aminoquinoxaline. Collection of the needles by suction filtration and drying in vacuo (0.1 mm. Hg) for 2 hours causes the needles to turn red. The red needles are obtained in a 2 part yield, M.P. 187° C. to 189° C. Without further purification, the compound is submitted for elemental analysis.

Calculated for $C_{14}H_{12}N_4$ (percent): C, 71.16; H, 5.12; N, 23.72. Found (percent): C, 70.97; H, 5.16; N, 23.70.

The infrared spectrum (absorption of 3400 cm.$^{-1}$ and an absence of nitro group absorption) and ultraviolet absorption ($\lambda_{max}$ 298 m$\mu$, dioxane) also support the structure of 2-(m-aminophenyl)-6-aminoquinoxaline.

EXAMPLE 6

Using the procedure of Example 5, the initial reaction product of Example 1, i.e., a mixture of 2-(p-nitrophenyl)-6-nitroquinoxaline and 2-(p-nitrophenyl)-7-nitroquinoxaline, is hydrogenated to a mixture of 2-(p-aminophenyl)-7-aminoquinoxaline and 2-(p-aminophenyl)-6-aminoquinoxaline.

EXAMPLE 7

Following the procedure of Example 5, 2,2'-di(p-nitrophenyl)-6,6'-diquinoxaline is hydrogenated to 2,2'-di(p-aminophenyl)-6,6'-diquinoxaline.

EXAMPLE 8

Following the procedure of Example 5, 2,2'-di(p-nitrophenyl)-6,6'-diquinoxalinyl ether is hydrogenated to 2,2'-di(p-aminophenyl)-6,6'-diquinoxaline.

EXAMPLE 9

Using solution polymerization techniques, 1.0112 g. of 2-(m-aminophenyl)-6-aminoquinoxaline is dissolved under nitrogen in 10 ml. of purified (distilled from phosphorus pentoxide) N-methylpyrrolidone. To the stirred solution, cooled with an ice bath, 0.8690 g. (solid) terephthaloyl chloride is added slowly. The solution becomes a viscous and turns red-orange in color. The solution is stirred at room temperature for 20 minutes and the polymer is recovered by pouring the solution in 300 ml. of vigorously stirred methanol (using a Waring blender). The fibrous material is washed with dilute methanol, anhydrous methanol, and dried in vacuo (0.2 mm. Hg) to obtain 1.6 g. of polymer. The polymer has excellent solubility in dimethyl formamide, dimethylacetamide, dimethyl sulfoxide, and other polar solvents. The inherent viscosity $$\left(\eta_{inh} = \frac{2.3 \log T/T_0}{\text{Conc. } g/100 \text{ ml.}}\right)$$

of the polymer in dimethylacetamide at 25° C. (0.5 g./100 ml.) is 1.21. The polymers form excellent films when cast from dimethylformamide solution. Fibers can be drawn from the polymer melt. The polymer has the following structure

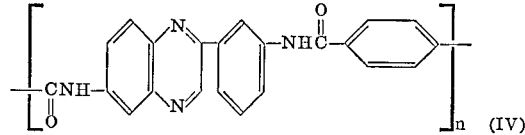

$n$ being the degree of polymerization. Differential thermal analysis and thermogravimetric analysis demonstrate the polymer to have stability in both nitrogen and air to greater than 450° C.

EXAMPLE 10

Using standard polyamide-acid preparative procedures, 1.090 g. of pyromellitic dianhydride is reacted with 1.180 g. of 2-(m-aminophenyl)-6-aminoquinoxaline in 20 ml. of N,N-dimethylformamide solution. Films cast from the DMA solution have good tensile, flexiiblity, etc. properties. The solid polymer is recoverd by pouring the DMA solution into 400 ml. of vigorously stirred anhydrous methanol (using a Waring blender) and drying in vacuo (0.2 mm. Hg) for four hours at room temperature. The polymer has an inherent viscosity of 0.55 in dimethylformamide (0.5 g./100 ml.) at 25° C., and has excellent solubility in many highly polar solvents. Infrared spectra changes, differential thermal analysis, and thermogravimetric analysis studies demonstrate that the polymer (V) cyclodehydrates readily with heat to afford the respective highly thermal stable (>550° C. in both nitrogen and air) polyamide (VI), having the following structures

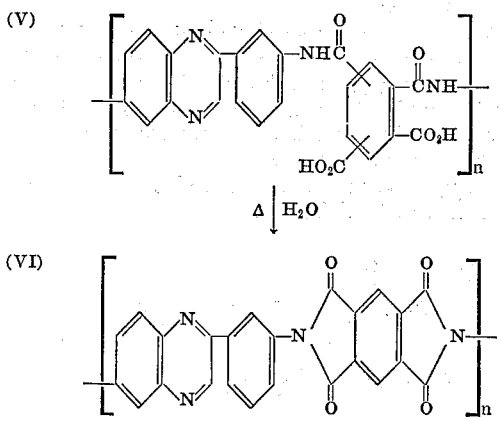

$n$ being the degree of polymerization in each instance.

EXAMPLE 11

Using the procedure of Example 10, a polyamide is prepared from terephthaloyl dichloride and a mixture of 2-(p-aminophenyl)-6-aminoquinoxaline and 2(p - aminophenyl)-7-amino quinoxaline. A polyamide containing recurring units having the formulas:

(VII)

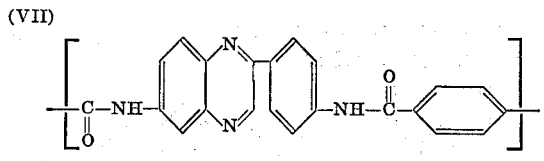

and (VIII)

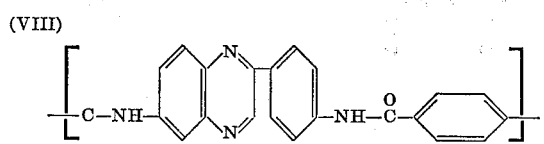

is obtained.

EXAMPLE 12

Following the procedure of Example 10, 2,2'-di(p-aminophenyl-6,6'-diquinoxaline is polymerized with pyromellitic anhydride. The polyimide obtained by dehydrating the resulting polyamide-acid has recurring units of the structure:

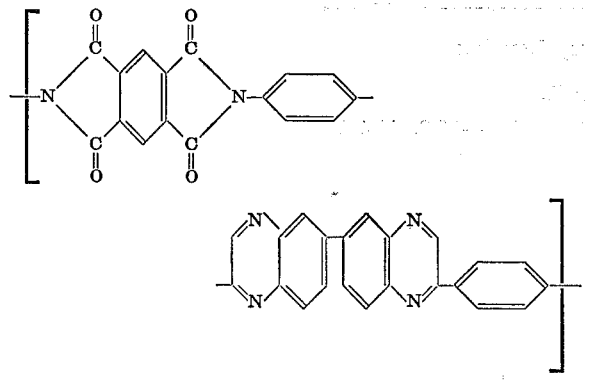

The foregoing examples have illustrated the preparation of the novel quinoxalines and their utilization in the formation of high molecular weight polyamides and polyimides characterized by high thermal stability. It will be apparent that the foregoing procedures can be similarly employed to prepare other dinitro- and diamino-quinoxalines, bisquinoxalines, and diquinoxalinyl compounds falling within the scope of the present invention. The utility of such diamines in the formation of polyamides and polyimides will be apparent from the foregoing examples.

The novel polyamides and polyimides are useful in the formation of shaped objects, unsupported films, filaments, laminates, and coatings. In coating applications employing the polyamide-acid intermediate, the coating composition can be modified by additives such as pigments, e.g. titanium dioxide. These coating compositions can be applied to a variety of substrates, for example, metals, e.g. copper, brass, aluminum, and steel, such metals being in the form of wire, sheeting, fiber, or screening; to glass; and to other polymeric materials. The polyamide-acid coatings are then converted to polyimide coatings by such methods as baking. Films of the polyamides and polyimides of the present invention can be employed in all applications heretofore developed for polyamide and polyimide films, such as high temperature insulation in transformers, capacitors, coil and cable wrappings, as printed circuit backing, as insulating layers in flat wire and cable assemblies, as liners in pipes and containers, and similar applications. The polyamides can be spun into fibers and made into fabrics which are particularly useful in applications subject to high temperature exposure.

I claim:

1. A film-forming polyimide consisting essentially of recurring units having the structural formula

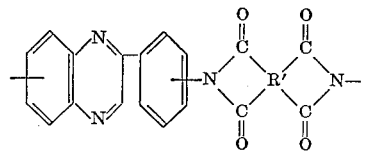

wherein R' is a tetravalent aromatic radical containing at least one benzene ring, the four carbonyl groups are directly attached to separate aromatic ring carbon atoms of R' and each pair of carbonyl groups is attached to adjacent carbon atoms in R'.

2. The polyimide of claim 1 in which the recurring units have the structural formula

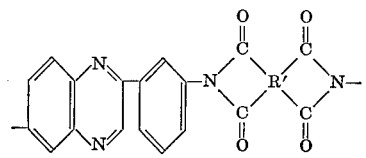

wherein R' has the aforedescribed significance.

3. The polyimide of claim 1 in which the recurring units have the structural formula

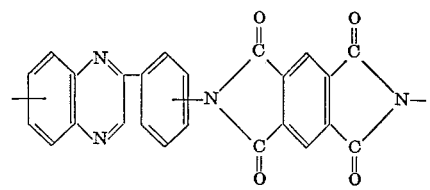

4. A film-forming polyimide consisting essentially of recurring units having the structural formula

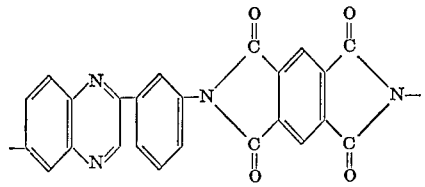

5. A film-forming polyimide consisting essentially of recurring units having the structural formula

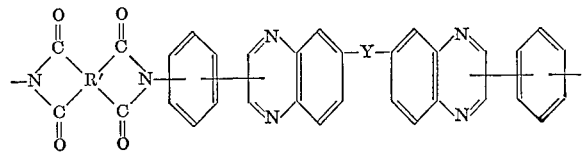

wherein R' is a tetravalent aromatic radical containing at least one benzene ring, the four carbonyl groups are directly attached to separate aromatic ring carbon atoms of R', each pair of carbonyl groups is attached to adjacent carbon atoms in R' and Y is a carbon-to-carbon bond or a divalent radical selected from the group consisting of oxygen, sulfur, sulfonyl and lower alkylene.

6. The polyimide of claim 5 in which the recurring units have the structural formula

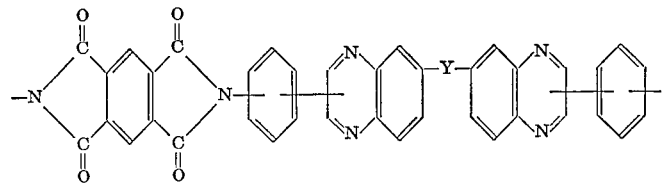

wherein Y has the aforedescribed significance.

7. A film-forming polyimide consisting essentially of recurring units having the structural formula

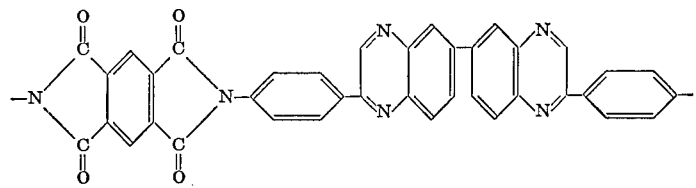

8. A film-forming polyimide consisting essentially of recurring units having the structural formula

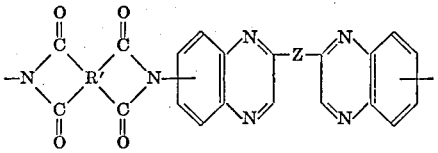

wherein R' is a tetravalent aromatic radical containing at least one benzene ring, the four carbonyl groups are directly attached to separate aromatic ring carbon atoms of R', each pair of carbonyl groups is attached to adjacent carbon atoms in R' and Z is a divalent aromatic radical containing one or two benzene rings.

9. The polyimide of claim 8 in which the recurring units have the structural formula

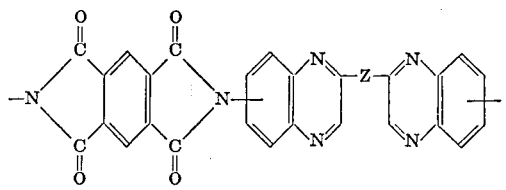

wherein Z has the aforedescribed significance.

10. The polyimide of claim 8 in which the recurring units have the structural formula References Cited

UNITED STATES PATENTS

| | | | |
|---|---|---|---|
| 3,310,506 | 3/1967 | Amborski et al. | 260—78 X |
| 3,342,774 | 9/1967 | Hoegger | 260—78 X |
| 3,247,165 | 4/1966 | Rodia | 260—78 X |

HOWARD E. SCHAIN, Primary Examiner

U.S. Cl. X.R.

117—124 E, 128.4, 132 C, 161 P; 260—30.2, 30.4 N, 30.6 R, 30.8 DS, 32.6 N, 37 N, 49, 78 TF